April 29, 1930.                R. GENENGER                1,756,118
                INCLINED FEED TRACK FOR PLASTIC PLATE GLASS
                          Filed Feb. 29, 1928
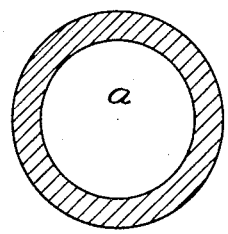
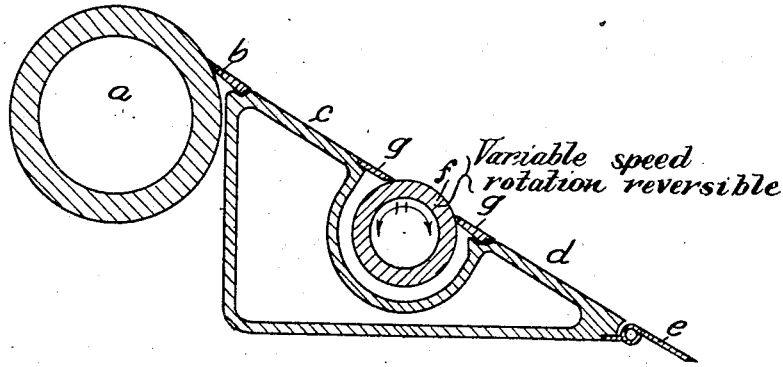
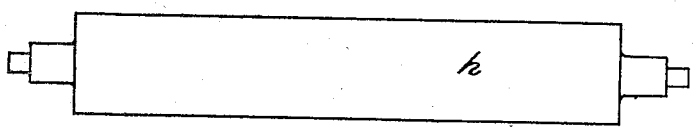
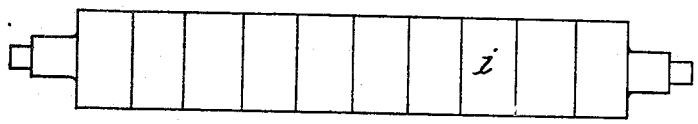
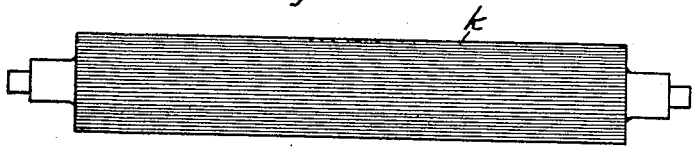
Inventor:
Richard Genenger,
per Doney Cole
Attorneys.

Patented Apr. 29, 1930

1,756,118

UNITED STATES PATENT OFFICE

RICHARD GENENGER, OF AACHEN-FORST, GERMANY, ASSIGNOR, BY MESNE ASSIGNMENTS, TO THE AMERICAN BICHEROUX COMPANY, A CORPORATION OF DELAWARE

INCLINED FEED TRACK FOR PLASTIC PLATE GLASS

Application filed February 29, 1928, Serial No. 257,895, and in Germany March 15, 1927.

In the known glass rolling machines for manufacturing plate glass, ornamental glass or other flat glass the rolled glass as it emerges from the forming rolls usually glides down over inclined planes to conveying means designed to run the rolled glass to and through the annealing oven, these conveying means consisting for instance of transporting tables or roller tracks.

In adjusting the inclination of the planes intermediate the rolling mechanism and the conveying means, care has to be taken that the glass plate or sheet in gliding down to the conveying means does not swell owing to excessive friction and that it does not elongate under the action of its own weight whereby creases are liable to be formed at the point where the plastic plate passes from the inclined plane to the conveying means. As the viscosity of the glass changes under the influence even of slight temperature variations, the proper thing to do would be to constantly regulate the inclination of the planes in accordance with the varying temperatures of working but this, of course, is not feasible in actual practice. The said inconveniences will especially enter into appearance when the inclined guide members have a great length.

Now, the invention has for its object to so improve the guiding of plastic glass plates down inclined planes that both swelling and elongating of the glass in passing over such planes is avoided, this object being attained by mounting in the inclined feed track supporting elements arranged to engage the glass plate from below and adapted to be moved at any desired speed in or opposite the direction of movement of the glass plates. The supporting elements are preferably formed by rollers which protrude slightly above the surface of the track and are in contact with the lower surface of the glass plates by segmental sections of their cylindrical surface.

An embodiment of the subject-matter of the invention is illustrated in the accompanying drawing in which:

Fig. 1 is a transverse section of an inclined chute provided with a supporting roller according to the invention, and Figs. 2 to 4 are views of different forms of supporting rollers.

$a$, $a$ are the forming rolls of a glass rolling machine by which plastic glass is rolled into plates or sheets. The plates emerging from the rolls $a$, $a$ glide down on an inclined plane formed by a chute which comprises an upper portion $c$ and a lower portion $d$. $b$ is a bridge member covering the space between the lower one of the forming rolls and the chute portion $c$. $e$ is a bridge member covering the space between the lower chute portion $d$ and the means (not shown) for conveying the glass plates to the annealing oven.

Mounted between the chute portions $c$ and $d$ in the longitudinal direction thereof, i. e. transversely of the direction of movement of the glass plates, is a roller $f$. This roller $f$ protrudes slightly above the guide surface of the chute so that it will act to support the glass passing over the chute surface. The spaces between the roller $f$ and the chute portions $c$ and $d$, respectively, are covered by bridge members $g$. Suitable means may be provided for rotating the roller in both directions at any desired speeds.

The roller may be formed with a smooth surface as shown at $h$ in Fig. 2, or it may be longitudinally divided into a plurality of transverse sections as shown at $i$ in Fig. 3, or it may have a longitudinally fluted surface as shown at $k$ in Fig. 4. The form shown in Fig. 4 is preferably used in order to attain a firmer grip between the roller and the glass plate.

If the angle of inclination of the chute surface is too small, the downward movement of the plastic glass plates might be more or less checked owing to excessive friction between the plate and the chute, whereby a swelling of the plate might be entailed. On the other hand, if the angle of inclination is too large, tensile stresses in the plastic glass under the influence of its own weight might be the cause of undesirable elongations. The roller in the chute serves to compensate for these contingencies. Of course, the inclination of the chute is as far as possible chosen so that at a certain temperature of working the mere supporting action of the roller suffices to prevent swelling or elongating of the plate. In this case the direction of rotation of the roller corresponds to the direction of feed of the glass and the circumferential speed of the roller is the same as the feed speed of the glass. In case the working temperature changes, the swelling of the glass plate or elongation of the same by tensile stress is reduced or avoided by properly changing the circumferential speed and, if necessary, also the direction of rotation of the roller. The roller therefore allows to maintain the evenness and uniform thickness of the rolled glass plate during its movement over the inclined chute also under varying working temperatures.

While only one roller is shown in the chute, there may be provided a plurality of such rollers according to the length of the chute. Besides, the rollers may be replaced by endless bands or the like movable elements.

Having thus described my invention, what I claim as new and desire to secure by Letters Patent, is:—

1. An inclined feed track for plastic glass plates, comprising a movable supporting roller mounted so as to protrude above the upper surface of the track into contact with the glass plates and adapted to be driven so as to cause its surface to move at various speeds in and opposite the direction of movement of the glass plates.

2. An inclined feed track for plastic glass plates, comprising a supporting roller mounted in the track transversely of the direction of movement of the glass plates, said roller being arranged so as to protrude above the guide surface of the track and engage the lower surface of the glass plates by segmental sections of its cylindrical surface and adapted to be rotated at various speeds in and opposite the direction of movement of the glass plates.

3. An inclined feed track for plastic glass plates, comprising a supporting roller mounted so as to protrude above the upper surface of said track to support said glass plates, with means for driving in either direction at various speeds, said supporting roller.

4. The method of conveying a formed sheet of plastic glass from the level at which it is formed to a lower level which comprises feeding said plastic sheet glass down an incline, the surface of which includes a roller arranged transversely to the movement of the plastic sheet, said roller protruding slightly above the adjacent surface of the incline, and pulling or retarding by the roller the plastic sheet to keep the formed sheet at the desired contour.

5. The method of taking away formed plastic sheet glass plates from a forming device which comprises feeding said plastic glass plates down an incline, the surface of which includes a roller arranged transversely of the direction of travel of the plastic sheet glass plates and above the adjacent surface of the incline, and regulating the direction and speed of rotation of the roller so that the plastic sheet glass plates will be taken away from the forming device at the same rate of speed that it is formed.

In testimony whereof I have signed my name to this specification.

RICHARD GENENGER.